(12) United States Patent
Kuo et al.

(10) Patent No.: US 7,656,547 B2
(45) Date of Patent: Feb. 2, 2010

(54) SYSTEM AND METHOD FOR OPTIMIZED ROUTING OF PRINT JOBS

(75) Inventors: Min Kuo, Irvine, CA (US); Jianxin Wang, Trabuco Canyon, CA (US)

(73) Assignees: Toshiba Corporation (JP); Toshiba Tec Kabushiki Kaisha (JP)

( * ) Notice: Subject to any disclaimer, the term of this patent is extended or adjusted under 35 U.S.C. 154(b) by 968 days.

(21) Appl. No.: 10/675,689

(22) Filed: Sep. 30, 2003

(65) Prior Publication Data

US 2005/0068546 A1 Mar. 31, 2005

(51) Int. Cl.
G06F 3/12 (2006.01)
G06K 15/00 (2006.01)
G05B 11/01 (2006.01)
G06F 9/46 (2006.01)
G06F 15/16 (2006.01)
G03G 15/00 (2006.01)

(52) U.S. Cl. .............. 358/1.15; 358/1.13; 358/1.14; 358/1.16; 700/19; 718/100; 709/208; 399/81; 399/82; 399/85; 399/87

(58) Field of Classification Search ............... 358/1.1, 358/1.15, 1.13, 1.14, 1.6, 1.9, 400, 409, 426.1, 358/448, 500; 709/201, 203, 221; 713/1
See application file for complete search history.

(56) References Cited

U.S. PATENT DOCUMENTS

| 6,348,971 | B2* | 2/2002 | Owa et al. .............. 358/1.15 |
| 6,452,692 | B1 | 9/2002 | Yacoub |
| 6,529,286 | B1 | 3/2003 | King |
| 6,552,813 | B2 | 4/2003 | Yacoub |
| 6,760,120 | B2* | 7/2004 | Kato .............. 358/1.15 |
| 7,145,678 | B2* | 12/2006 | Simpson et al. ............. 358/1.15 |
| 7,151,611 | B2* | 12/2006 | Sesek .............. 358/1.13 |
| 2001/0052995 | A1* | 12/2001 | Idehara .............. 358/1.15 |
| 2002/0089687 | A1 | 7/2002 | Ferlitsch et al. |
| 2002/0089688 | A1 | 7/2002 | Ferlitsch et al. |
| 2003/0011805 | A1 | 1/2003 | Yacoub |
| 2003/0084044 | A1 | 5/2003 | Simpson et al. |
| 2003/0090697 | A1 | 5/2003 | Lester et al. |
| 2003/0128384 | A1 | 7/2003 | Nelson et al. |
| 2003/0160993 | A1* | 8/2003 | Kang .............. 358/1.15 |

* cited by examiner

Primary Examiner—King Y Poon
Assistant Examiner—Neil R McLean
(74) Attorney, Agent, or Firm—Tucker Ellis & West LLP

(57) ABSTRACT

This invention is directed to a system and method for optimized routing of print jobs. The system and method comprise queuing print job data, selectively communicating the print job data to at least one of a plurality of associated printer devices so as to generate a printout therefrom, and receiving status data from at least one of the plurality of associated printer devices, which status data includes data representative of a commitment level of the at least one associated printer device relative to dominant print job requests. The system and method also comprise testing the status data against selected test criteria to determine whether at least one alternative associated printer device is desired for printing and selectively redirecting the print job data from a primary designated associated printer device to a secondary associated printer device in accordance with an output of the test means.

12 Claims, 3 Drawing Sheets

SYSTEM AND METHOD FOR OPTIMIZED ROUTING OF PRINT JOBS

BACKGROUND OF THE INVENTION

This invention is directed to a system and method for optimized the routing of print jobs. More particularly, this invention is directed to a system and method for optimized routing of print jobs to maximize the printing speed of a network having multiple printer devices by sending the print job to the printer having the smallest print queue.

On a network having multiple printer devices attached thereto, the speed of which a given print job is printed depends on the total number of jobs and the size of such jobs that are already in the print queue. A print job will be printed in the shortest time only if it is sent to the printer device on the network that currently has the smallest job loading waiting in its queue as compared to other printer devices available to the user. However, such information is generally not readily available to the user. Therefore, the user will generally select a printer device based on attributes other than the time required to print or the size of the print queue for such printer device. As such, even if the user needs the print job completed quickly, the user may select a printer device with a very large print queue, increasing the time to complete the print job.

It is desirable to have a system and method for optimized routing of print jobs wherein print jobs are routed to the printer device with the smallest print queue.

SUMMARY OF THE INVENTION

In accordance with the present invention, there is provided a system and method for optimized routing of print jobs.

Further, in accordance with the present invention, there is provided a system and method in which print jobs are routed to the printer device with the smallest print queue.

Further, in accordance with the present invention, there is provided a system and method which facilitates more efficient distribution of print jobs among all the printer devices on a network.

Still further, in accordance with the present invention, there is provided a system for optimized routing of print jobs comprising queuing means adapted for queuing print job data and means adapted for selectively communicating the print job data to at least one of a plurality of associated printer devices so as to generate a printout therefrom. The system also comprises terminal means adapted for receiving status data from at least one of the plurality of associated printer devices, which status data includes data representative of a commitment level of the at least one associated printer device relative to dominant print job requests and test means adapted for testing the status data against selected test criteria to determine whether at least one alternative associated printer device is desired for printing. The terminal means also include means adapted for selectively redirecting the print job data from a primary designated associated printer device to a secondary associated printer device in accordance with an output of the test means.

Further, in accordance with the present invention, a user inputs pre-authorization to redirect a print job to a selected, alternative printer in the event of a delay in printing from a primary printer. In accordance with another aspect, a user is queued for permission to queue an alternative printer when selected delay criteria have been met relating to a primary printer selection. In this event, a user may accept the alternative printer, or reaffirm the instructions to queue to the primary printer notwithstanding the delay.

Still further, in accordance with the present invention, there is provided a method for optimized routing of print jobs comprising the steps of queuing print job data and selectively communicating the print job data to at least one of a plurality of associated printer devices so as to generate a printout therefrom. The method also comprises receiving status data from at least one of the plurality of associated printer devices, which status data includes data representative of a commitment level of the at least one associated printer device relative to dominant print job requests and testing the status data against selected test criteria to determine whether at least one alternative associated printer device is desired for printing. The method further comprises selectively redirecting the print job data from a primary designated associated printer device to a secondary associated printer device in accordance with an output of the test means.

In a preferred embodiment, the test criteria includes data representative of a commitment level of the at least one alternate associated printer device. In a more preferred embodiment, the print job data is selectively redirected to the secondary associated printer device which has the lowest commitment level.

In one embodiment, the system and method automatically route the print job data to another printer device without user intervention. In another embodiment, a manual mode, the user selects the printer device in which to route the print job.

These and other aspects, features, and advantages of the present invention will be understood by one skilled in the art upon reading and understanding the specification.

DETAILED DESCRIPTION OF THE PREFERRED EMBODIMENTS

This invention is directed to a system and method for optimized routing of print jobs. Preferably, the system and method maximize printing speed on a network having multiple printers by sending a print job to the printer with the smallest job queue. The system and method re-map the printer port to the printer device having the smallest queue, avoiding those printers with long waits before printing. The system and method use three software components, a graphical user interface, a search dynamic link library and a mapping dynamic link library. Capable of operating in automatic mode, without the graphical user interface, or in manual mode with the graphical user interface, the system and method search the printer devices attached to the network, determining the printer device having the smallest total job size. In automatic mode, the search dynamic link library will select the printer device with the smallest total job size and the mapping dynamic link library will then re-map the printer port to that printer device with the smallest queue. In manual mode, a user selects the printer device from a listing displaying all printer devices found by the search dynamic link library and their respective sizes. The mapping dynamic link library will then re-map the printer port to the user selected printer device.

Although discussed with reference to printer devices and print jobs, the system and method of the present invention is suitable for any image generating device and imaging job to optimize routing of the imaging jobs to the image generating device on the network available and having the smallest queue.

Figure 1:
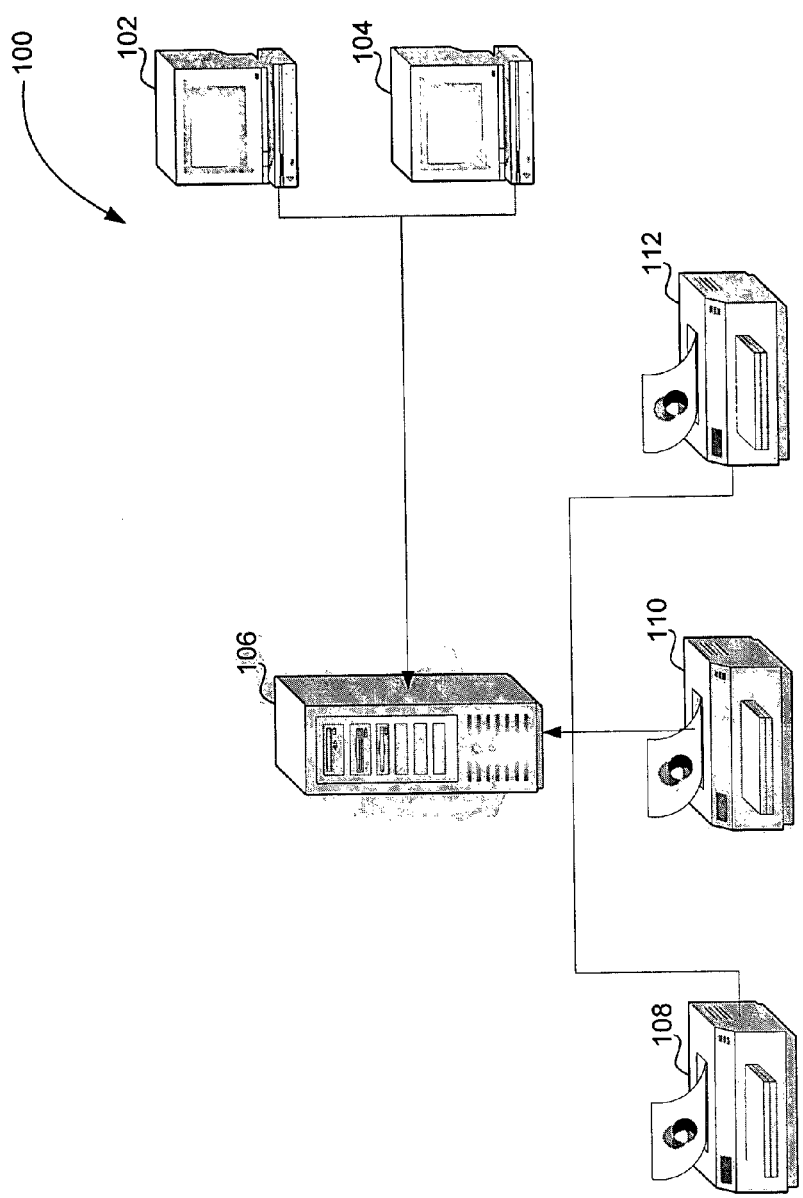
FIG. 1 is a block diagram depicting an exemplary network configured to deploy the method and implementation of the present invention.

An exemplary network 100 is shown in FIG. 1 for deploying the method and implementation of the present invention. One or more client machines, as illustrated by two machines 102 and 104, send print job requests which are received and responded to by controller/server 106. A suitable client machine is any suitable networked computer or data terminal as will be appreciated by one of ordinary skill in the art. In creating the print job request, the user selected a printer device for printing the print job. The controller governs access to the printer devices 108, 110, 112 attached to the network. Preferably, the controller then routes the print job to the printer device having the smallest print queue. This printer device is either selected automatically or manually by the user. The print job is sent to the specified printer. The specified printer device receives the print job request and adds the print job to its print queue. Preferably, the print jobs are printed in the order they are received by the printer device.

In one embodiment an associated user inputs pre-authorization to redirect a print job to a selected, alternative printer in the event of a delay in printing from a primary printer. The user is queued for permission to queue an alternative printer when selected delay criteria have been met relating to a primary printer selection. In this event, a user may accept the alternative printer, or reaffirm the instructions to queue to the primary printer notwithstanding the delay.

Figure 2:
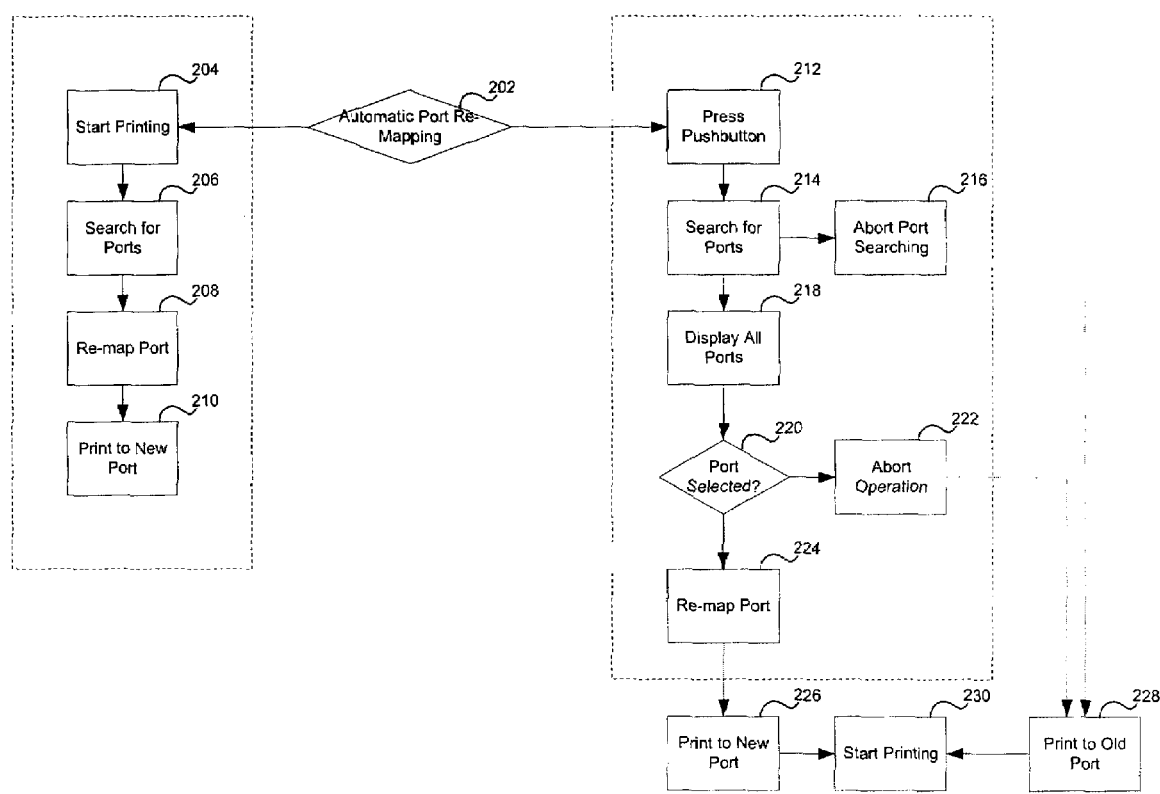
FIG. 2 is a flow chart illustrating the method according to the present invention.

FIG. 2 shows a flow chart 200 illustrating the method according to the present invention. At 202, a determination is made whether the system is in automatic mode or manual mode. The automatic or manual mode is selected by the user by any suitable means.

If the system is in automatic mode, then the flow proceeds to 204 wherein the system starts printing the print job by any suitable means. Flow then proceeds to 206 wherein the search dynamic link library searches for printer devices immediately after the print job is started. The search dynamic link library searches the network for all the printer devices that are online or available for printing. In a preferred embodiment, the search dynamic link library is configured to only search the local subnet or search within a specified TCP/IP range. The search dynamic link library queries each printer device via any suitable means for its commitment level or the total number of print jobs and the size of each job. Preferably, the search dynamic link library queries the printer devices through simple network management protocol. The printer devices respond with the requested information via any suitable means.

Flow then proceeds to 208 wherein the mapping dynamic link library routes the print job to a suitable printer device for the print job via any suitable means. Preferably, the print job is routed to the printer device with the lowest commitment level or the smallest total job size in its print job queue. Flow then proceeds to 210 wherein the print job is spooled to the selected printer device and printed.

Figure 3:
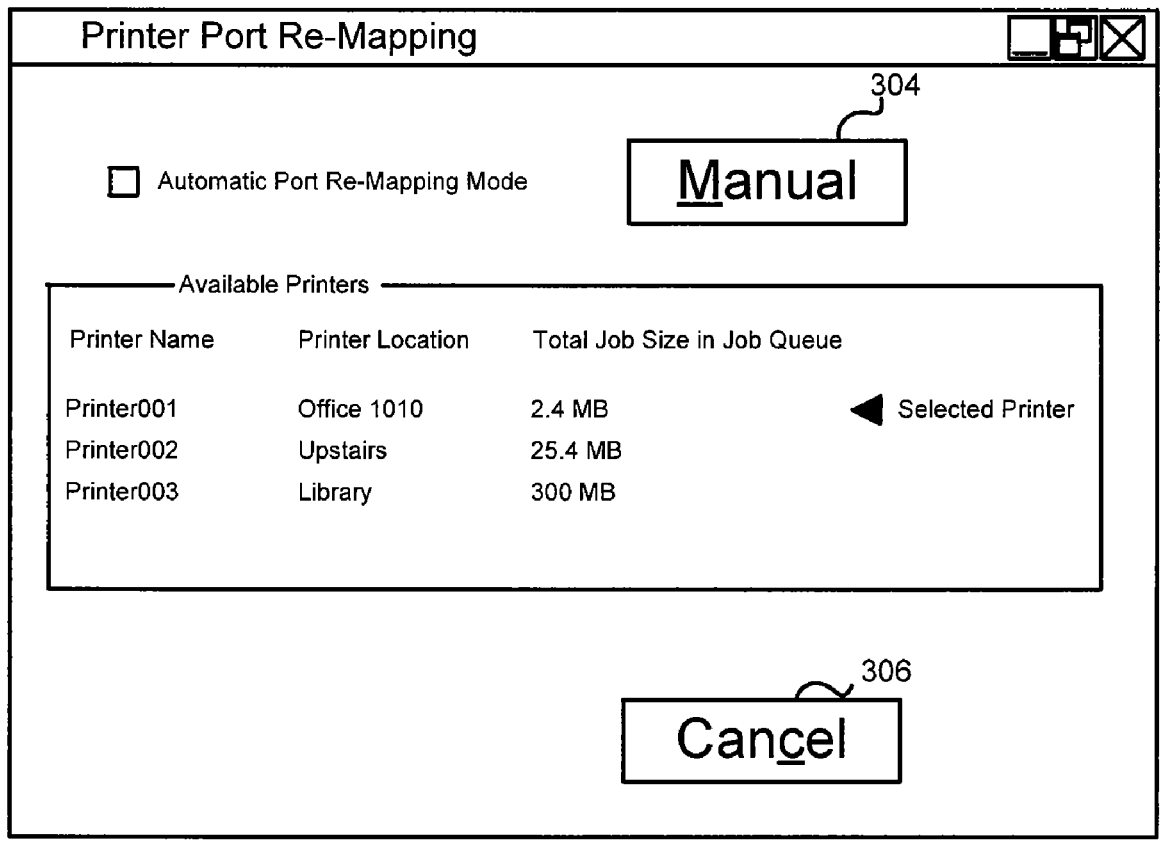
FIG. 3 is a template graphical user interface according to the system and method of the present invention.

If it is determined that the system is in manual mode, flow proceeds to 212 wherein the user evokes the manual mode by any suitable means, such as selecting the Manual button 304 shown in FIG. 3. Flow then proceeds to 214 wherein the search dynamic link library searches the network for all the printer devices that are online or available for printing. In a preferred embodiment, the search dynamic link library is configured to only search the local subnet or search within a specified TCP/IP range. The search dynamic link library queries each printer device via any suitable means for its commitment level or the total number of print jobs and the size of each job. Preferably, the search dynamic link library queries the printer devices through simple network management protocol. The printer devices respond with the requested information via any suitable means.

The user may terminate the search process by any suitable means as shown at 216, such as selecting the Cancel button 306 as shown in FIG. 3. If the search process is terminated, flow proceeds to 228 wherein the print job is routed to the printer device originally selected by the user. Flow then proceeds to 230 wherein the print job is spooled to the selected printer device and printed.

Once the search dynamic link library has queried all the available printer devices, the results are displayed for the user via any suitable means as shown at 218. Preferably, the results are displayed in an order sorted by the total job size of each printer device. The user then selects a printer device by any suitable means as shown at 220. If the user does not select a printer device, then flow proceeds to 222 wherein the process is terminated. If the process is terminated, flow proceeds to 228 wherein the print job is routed to the printer device originally selected by the user. Flow then proceeds to 230 wherein the print job is spooled to the selected printer device and printed.

If the user selects a printer device, flow proceeds to 224 wherein the mapping dynamic link library routes the print job to a suitable printer device for the print job via any suitable means. Flow then proceeds to 226 wherein the printer device receives the print. Flow then proceeds to 230 wherein the print job is spooled to the selected printer device and printed.

As described hereinabove, the present invention solves many problems associated with previous type methods and implementations. However, it will be appreciated that various changes in the details, materials and arrangements of parts which have been herein described and illustrated in order to explain the nature of the invention may be made by those skilled in the are within the principle and scope of the invention will be expressed in the appended claims.

What is claimed is:

1. A system for optimized routing of print jobs comprising:

means adapted for commencing a print job to a primary printer corresponding to a print port associated with a client machine queuing means adapted for queuing print job data in accordance with a commenced print job;

means adapted for receiving a print optimization instruction from an associated user;

means adapted for selectively communicating the print job data to the print port so as to generate a printout therefrom;

terminal means adapted for receiving status data from each of a plurality of associated printer devices, which status data includes data representative of a commitment level of each associated printer device relative to prior print job requests associated therewith;

means adapted for receiving a print optimization instruction from the associated user in response to an issued prompt so as to commence selection of an alternative associated printer device for printing;

means adapted for receiving, from the associated user, delay criteria data corresponding to an associated delay period associated with commencement of the print job prior to submission thereof;

means adapted for receiving preauthorization data from the associated user corresponding to a pre-authorization of a routing of the print job to at least one secondary associated printer device;

means adapted for determining elapsed time relative to printer availability for commencement of the print job relative to each of the plurality of printer devices;

test means adapted for testing the status data against selected test criteria, elapsed time, and received delay criteria data to determine whether at least one alternative associated printer device is desired for printing;

means adapted for generating a display to the associated user inclusive of the elapsed time relative to the at least one alternative associated printer;

mean adapted for receiving, from the associated user, selection data corresponding to a selection of a confirmation to print to the primary printer or alternatively to the at least one alternative associated printer in accordance with preferences of the associated user; and the terminal means including means adapted for autonomously redirecting, in accordance with received preauthorization data and received selection data, the print job data from a primary designated associated printer device by assigning the print port to a device port of a secondary associated printer device of the plurality thereof in accordance with the print optimization instruction and an output of the test means wherein the output of the testing means is indicative that the primary designated associated printer device exceeds the user-specified delay criteria.

2. The system for optimized routing of print jobs of claim 1 wherein the test criteria includes data representative of a commitment level of the at least one alternate associated printer device.

3. The system for optimized routing of print jobs of claim 2 wherein the print job data is selectively redirected to the secondary associated printer device which has the lowest commitment level.

4. The system for optimized routing of print jobs of claim 1 wherein the means adapted for selectively redirecting the print job data the further comprises means adapted for displaying all available associated printer devices for the user to select a secondary associated printer device in which to route the print job data.

5. The system for optimized routing print jobs of claim 2 wherein the means adapted for redirecting the print job data further comprises:
    means adapted to receive user input to terminate the routing of the print job data to the secondary associated printer device; and
    terminating means adapted to terminate routing of the print job data to the secondary associated printer device in response to user input.

6. The system for optimized routing of print jobs of claim 1 wherein the means adapted for prompting an associated user is a graphical user interface.

7. A method for optimized routing of print jobs comprising the steps of:
    commencing a print job to a primary printer corresponding to a print port associated with a client machine;
    queuing print job data in accordance with a commenced print job;
    issuing a prompt to an associated user for a print optimization authority;
    selectively communicating the print job data to the print port so as to generate a printout therefrom;
    receiving status data from each of a plurality of associated printer devices, which status data includes data representative of a resource commitment level of each associated printer device relative to prior print job requests associated therewith;
    receiving a print optimization instruction from the associated user in response to an issued prompt so as to commence selection of an alternative associated print device for printing;
    receiving, from the associated user, delay criteria data corresponding to an acceptable delay period associated with commencement of the print job prior to submission thereof;
    receiving preauthorization data from the associated user corresponding to a pre-authorization of a routing of the print job to at least one secondary associated printer device;
    determining elapsed time relative to printer availability for commencement of the print job relative to each of the plurality of printer devices;
    testing the status data against selected test criteria, elapsed time, and received delay criteria data to determine whether at least one alternative associated printer device is desired for printing;
    generating a display to the associated user inclusive of the elapsed time relative to the at least one alternative associated printer;
    receiving, from the associated user, selection data corresponding to a selection of a confirmation to print to the primary printer or alternatively to the at least one alternative associated printer in accordance with preferences of the associated user; and
    autonomously redirecting, in accordance with received preauthorization data and received selection data, the print job data from a primary designated associated printer device by assigning the print port to a device port of a secondary associated printer device of the plurality thereof in accordance with the print optimization instruction and an output of the testing step, wherein the output of the testing step is indicative that the primary designated associated printer device exceeds the user-specified delay criteria.

8. The method for optimized routing of print jobs of claim 7 wherein the test criteria includes data representative of a commitment level of the at least one alternate associated printer device.

9. The method for optimized routing of print jobs of claim 8 wherein the print job data is selectively redirected to the secondary associated printer device which has the lowest commitment level.

10. The method for optimized routing of print jobs of claim 8 wherein the step of selectively redirecting the print job data further comprises the step of displaying all available associated printer devices for the user to select a secondary associated printer device in which to route the print job data.

11. The method for optimized routing print jobs of claim 8 wherein the step of selectively redirecting the print job data further comprises the steps of:
    receiving user input to terminate the routing of the print job data to the secondary associated printer device; and
    terminate routing of the print job data to the secondary associated printer device in response to user input.

12. The method for optimized routing of print jobs of claim 8 wherein prompting an associated user is performed via a graphical user interface.

* * * * *

UNITED STATES PATENT AND TRADEMARK OFFICE
CERTIFICATE OF CORRECTION

PATENT NO.        : 7,656,547 B2                                        Page 1 of 1
APPLICATION NO. : 10/675689
DATED             : February 2, 2010
INVENTOR(S)       : Kuo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this

Twenty-eighth Day of December, 2010

David J. Kappos
*Director of the United States Patent and Trademark Office*